United States Patent [19]
Romijn

[11] 3,765,188

[45] Oct. 16, 1973

[54] METHOD FOR FREEZING PRODUCTS BY DIRECT-CONTACT WITH AN EVAPORATING FREEZING AGENT

[75] Inventor: Johannes Gerardus Romijn, S-Hertogenbosch, Netherlands

[73] Assignee: Grasso's Koninklijke Machinenfabrieken, N.V.

[22] Filed: Jan. 31, 1972

[21] Appl. No.: 222,082

[30] Foreign Application Priority Data
Feb. 2, 1971  Netherlands .................... 7101362

[52] U.S. Cl. ........................................ 62/64, 62/85
[51] Int. Cl. ............................................ F25d 17/02
[58] Field of Search ............................ 62/63, 64, 85

[56] References Cited
UNITED STATES PATENTS
2,502,527   4/1950   McFarlan ......................... 62/85 X
3,007,319   11/1961  Ogden ............................... 62/64
3,479,833   11/1969  Waldin .............................. 62/63

*Primary Examiner*—Meyer Perlin
*Assistant Examiner*—Ronald C. Capossela
*Attorney*—Nathaniel L. Leek

[57] ABSTRACT

A novel method and apparatus for quickly freezing food products by a direct contact with an evaporating liquid freezing agent with a minimum of loss of the freezing agent comprising feeding the food into a freezing vessel; substantially removing all the air in this freezing vessel by purging with vapors of the freezing agent; freezing of the food by means of direct contact with the liquid freezing agent; purging the vessel of freezing agent vapor by means of air and removing the frozen food product.

11 Claims, 1 Drawing Figure

3,765,188
PATENTED OCT 16 1973
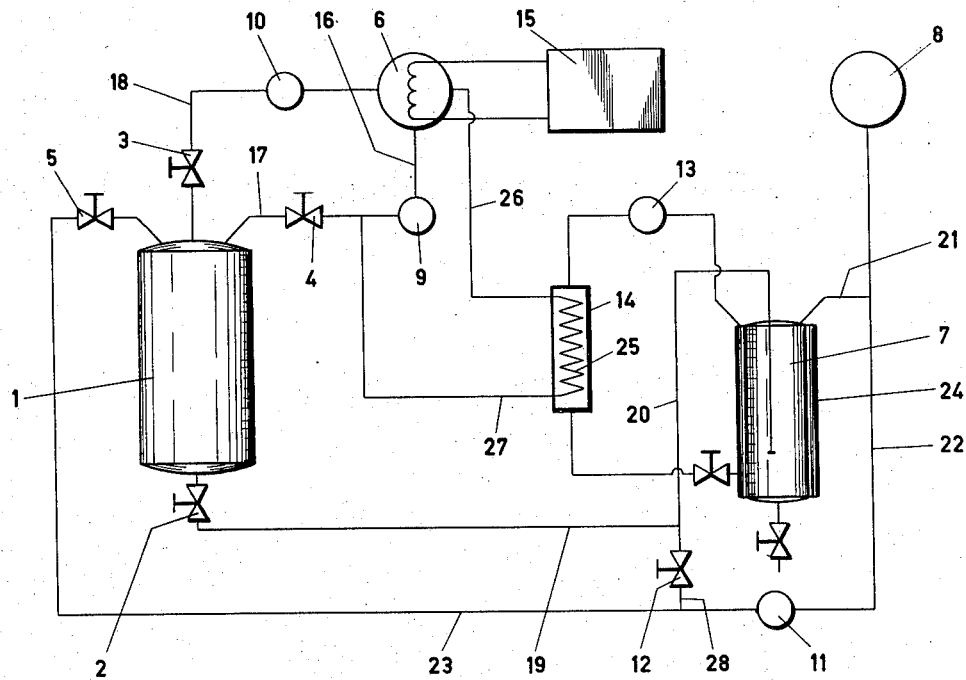

METHOD FOR FREEZING PRODUCTS BY DIRECT-CONTACT WITH AN EVAPORATING FREEZING AGENT

It is known from the U.S. Pat. No. 3,368,363, that food can be very quickly frozen by immersing it in, or sprinkling it with a liquid having a boiling point below the freezing point of the food, i.e., between −5° and −50°C. In consequence of the exceptionally good heat-transfer between the ebullient liquid and the food and in consequence of the low temperature of the liquid, heat is being withdrawn so quickly that many food will be frozen within a couple of minutes.

In consequence of the fast freezing a conserved product is formed which after having been thawed and prepared, deviates much less from a fresh product than a product which has been frozen more slowly.

By the simple and direct method of heat-withdrawal by means of immersion or sprinkling in contact with an ebullient liquid, it is to be expected that the equipment destined for this freezing will also be simpler than with other less direct methods.

Moreover it is to be expected that the consumption of energy of the cooling plant for the withdrawal of heat will be lower.

If the ebullient liquid, with which the food is being brought into contact, is harmless for the food and in the existing small concentrations in the food is also harmless for the health of man and animal, then this method is useful. One of the substances which meets all the requirements mentioned above, is pure dichlorodifluoromethane, indicated in trade and in the cooling technics mostly as R12.

With low temperatures this liquid is chemically stable and not hygroscopic.

Another important benefit of this liquid is, that it does not attach itself much to the food with which it is brought into contact, so that it appears after freezing, that per unit of weight of frozen food the quantity of R12 still existing in it, is mostly smaller than one ten thousandth unit of weight.

In the U.S. Pat. No. 3,368,363 an apparatus and a method is described in which, by means of the above mentioned liquid refrigerant R12 ($C.Cl_2F_2$, diclorodifluoro-methane), food is being frozen. With this method attention is paid to the prevention of the loss of vapour of this liquid. This is necessary because the substance in its pure form, in which it is suitable for this method is costly. According to the description in the above mentioned patent specification it is thus possible to reduce the loss of vapour to two parts by weight per 100 parts of the food frozen in the apparatus. According to this method the escape of vapour is being reduced by locks, as well as the penetration of atmospheric air into the apparatus. Besides the vapour together with the air, the water vapour, the carbon dioxide and other volatile substances existing in it is being compressed to a pressure in which the vapour in a water-cooled heat exchanger will condense and afterwards be brought back to the freezing apparatus. Care is being taken that the non-condensed substances are separated from the liquid and are discharged to the atmosphere in such a way that only little of the liquid refrigerant (R12) is lost as vapour.

The described method is based on generally known methods in the cooling technics and usable herein, but this method is complicated owing to the many mechanical aids and appliances required for that purpose. It is not quite reliable owing to the considerable impurites being carried along with the vapour stream, especially water vapour, and which may cause chokings in narrow passages at a low temperature and it is above all not very active because much air penetrates into the apparatus through the locks and vapour escapes and also because when the liquid and the non-condensed substances are being separated a large quantity of vapour is carried along with the non-condensed substances.

Besides, an objection to this method is, that the vapour together with the air and other vapours is being compressed and as a result thereof obtains a temperature far above the atmospheric temperature.

The pure compound $C Cl_2F_2$ can under these circumstances, in contact with metals (and in the presence of water vapour, air, carbon dioxide and other volatile substances) be transformed in a small degree into substances which are very harmful to the health.

The invention described below, avoids all the above mentioned objections and means an important improvement of the applicability of the method mentioned before of the freezing of food.

The method according to this invention is simple, does not give cause for chokings, it is very efficient, even so that the loss of vapour can be simply reduced to 1/10 parts by weight per hundred parts by weight of frozen food. Moreover the vapour is not compressed considerably in any part of the process, while the maximal temperature falling to the vapour in any part of that process, is lower than the temperature of the food brought in, which is usually lower than that of the atmosphere.

The method according to this invention consists of the fact, that the vessel, the apparatus or the locks in which or through which the food is being brought in and in which accordingly air is present together with all its components, is flushed with the vapour of the ebullient freezing liquid, as a result of which the air is expelled and rarefied, to such an extent that the partial pressure of the air has fallen to a value whereby the action of the freezing apparatus is not reduced, for instance to about 0.05 bar, that is 5/100 of the total pressure in the vessel or freezing apparatus or lower.

When the frozen product leaves the freezing apparatus, the vessel or the lock contains only the frozen product and the vapour of the freezing liquid. The vapour is expelled from the vessel or the lock by flushing with air or an other suitable gas, to such an extent that only a small quantity of vapour will stay behind. In emptying the vessel or the lock the remaining vapour will be lost almost completely.

With the method according to this invention this quantity can be simply reduced to 1/10 parts by weight per 100 parts by weight of frozen food.

In doing so there is no need of complicated mechanical constructions such as blowing devices, compressors and vacuum airpumps.

During the freezing of the food the vapour formed by the boiling process of the liquid, is condensed on a cold surface, consisting of cooled pipes or plates. This surface can be cooled by the usual industrial cooling plants, which may be chosen in such a way as to achieve the best possible results. With the method according to this invention condensation of the vapour of the freezing liquid on the cooled surface is scarcely hampered by the presence of non-condensable gases or by reduction of the vapour tension and accordingly of the condensation temperature of the vapour as a result of strong rarefying by non-condensable gases.

Therefore the temperature of the cooled surface can almost be equal to that of the ebullient freezing liquid or just a little bit lower, for instance 1° C. For the benefit or condensation the vapour can be moved strongly by suitable means; besides it is possible to stimulate condensation of the vapour by sprinkling part of the liquid over the cooled surface, as a result of which the liquids gets supercooled and the vapour can also condense on the falling drops. During the sprinkling with the vapour and the air a mixture of vapour and air is being discharged from the vessel or the locks of the freezing apparatus. This mixture should be actively separated before the air can escape to the atmosphere.

According to the method of this invention the mixture is led through a vessel or column, which is filled with part of the freezing liquid at a temperature between −60° and −120° C, or through a heat exchanger which is being kept at said low temperature. The vessel or the column is preferred, because owing to close contact in there between the mixture of vapour and air, and the cold liquid, the vapour will for the greater part condense and water and other condensable volatile components of the mixture will stay behind in the liquid and admixtures, which do not dissolve in the liquid can be easily be removed, while nevertheless in the heat exchanger vapour and condensable admixtures are condensed, but an accumulation of admixtures, which do not dissolve in the liquid can easily cause chokings, which is one of the objections to the method according to U.S. Pat. No. 3,368,363.

The mixture coming out of the column or the vessel contains all the air and such a quantity of vapour as corresponds with the vapour tension at the temperature of the column. With the R12 freezing liquid the vapour tension is: at −60° C about 0.23 bar and the specific volumne of the vapour 0.63 m³/kg; at −90°C about 0.03 bar, and the specific volume 4 m³/kg; at −120° C about 0.002 bar and the specific volume about 30 m³/kg.

That means that with each m³ of air coming out of the column or the vessel, resp. about 1.5 kg R12 at −60° C, 0.25 kg R12 at −90° C and 0.03 kg. R12 at −120° C columntemperature should be lost with the air.

For freezing 1,000 kg of food a vessel is needed of about 2 m³, so that about 1 m³ will be taken in by the air.

For washing away and rarefying the air, 2 to 5 m³ of vapour are needed. In the same way, 2 to 5 m³ of air are needed for washing away and rarefying the vapour to take care that the quantity of vapour leaving the vessel or the lock together with the frozen food, is smaller than 1 kg per 1,000 kg. of product.

Consequently 1 m³ of air passes through the column together with the food and 2 to 5 m³ of air needed to wash away the vapour; total therefore 3 to 6 m³ per 1,000 kg of food.

As a result of this the loss of vapour at a columntemperature of −60° C would amount to max. 9 kg. per 1,000 kg and at a columntemperature of −120° C. 0.1 kg per 1,000 kg plus 0.1 kg/1,000 kg owing to loss of vapour from the lock or the vessel. In comparison with the 40 kg per 1,000 kg according to the method described in the U.S. Pat. No. 3,368,363, this means, especially at temperature lower than −60° C, an important increase of the action of the method in order to recover the vapour. A method where, apart from some shut off valves and an air pump of little capacity and difference of pressure, no moving parts are present in the vapour lines.

The condensed liquid can be brought back into the freezing apparatus by means of evaporation at for instance 1 bar, while the boiling point is about −30° C, and all impurities will stay behind in the column. By means of the choice of the contents of the column, this action may, if necessary, be reduced to for instance once a day or even once a week, but it may be performed continuously as well.

A refinement of the above described method according to this invention is the following:

The air which is present in the vessel or the lock when the food is brought in, is expelled by the vapour as described above and for the greater part stripped of the vapour and of the admixtures in the column with cold liquid and afterwards temporarily assembled in a balloon or a small gas holder.

The air is allowed to have a rather high vapour concentration for instance up to a vapour tension of 0.5 bars, as a result of which the liquid in the column, when the vapour therein is condensing, only has to be cooled up to −45° C. As a result of this a smaller cooling plant of the column will suffice than according to the method described earlier.

With a circulating pump for the air it is now possible, during the period that the lock does not work or during the freezing period in the vessel, to lead the air through the column again and again, while the cooling plant of the column continues working and as a result of which reduces the temperature of the liquid in the column to for instance −60° or −70° C, in consequence whereof the vapour tension of the liquid refrigerant falls to below 0.23 bar.

In case the food has to leave the vessel or the lock, the air is held out of the balloon or the gas holder with the airpump through the vessel or the lock, while the vapour in the vessel or the lock is being washed away and rarefied.

The mixture coming out of the vessel or the lock, is led through the column till the vapour tension of the vapour in the lock or the vessel is almost equal to the vapour tension of the liquid in the column. That is to say at −60° C in the column almost equal to 0.23 bar or at −90° C in the column up to 0.03 bar, accordingly as the recovery having to be less active or active.

When this low vapour tension has been reached, the food leaves the apparatus together with the air and a small quantity of vapour.

The volume of the air per 1,000 kg. of food, passing through the freezing apparatus with this improved method, and is lost in the atmosphere, is now reduced to not more than about 1 m³, as a result of which the loss of vapour is reduced to about 1.5 kg per 1,000 kg of food, the columntemperature being −60° C and to 0.25kg per 1,000 kg of food, the final temperature in the column being −90° C.

The invention is illustrated further by the drawing.

The liquid side of a condenser 6 for the vapour of the freezing agent has been connected with a freezing vessel 1, which may be provided with locks (not shown in the drawing) for the introduction and discharge of the food, via a line 16, 17, in which line 16, 17 there is a liquid condensate pump 9 and a shut off valve 4. The freezing vessel 1 is connected on the vapour side of the condenser 6 via a line 18 with a shut off valve 3 and a vapour ventilator 10. The cooling plant for the condenser 6 has been given the reference number 15.

The freezing vessel 1 is connected with a column 7, via a line 19, 20, provided with a shut off valve 2 and a line 21, 22, 23, provided with an air pump 11 and a shut off valve 5; the cooling jacket 24 is being cooled via a cooling plant 13, which is connected with a condenser 14. The cooling spiral 25 of the condenser 14 is connected with the freezing medium in the condenser 6 via lines 26, 27 and line 16. A balloon or gasholder 8 is connected with the lines 21, 22, while line 28, provided with a shut off valve 12 connects the lines 19, 20 and 22, 23.

An example of the method for the recovery of the vapour according to the invention is the following:

1,000 kg of food with a contents of 2 m$^3$ are being brought into the freezing vessel 1. After closing, the vessel contains 1,000 liter of air. Now about 5,000 liter of vapour is being blown rapidly through the vessel, for instance by bringing from the condenser 6 for the vapour 30 kg. of liquid in the vessel 1 via the line 16, 17 through the pump 9 with the shut off valve 4 being opened.

This liquid evaporates very quickly when it is brought into contact with the still warm food and procures at 1 bar absolute pressure about 5,000 liter of vapour. As a result of this the air is being expelled and rarefied to a partial airpressure of 5/100 to 1/100 bar in vessel 1, while a mixture of 24 kg of vapour and about 1.25 kg. of air flows through line 19, 20 to column 7 with the shut off valve 2 being opened and about 6 kg. of vapour stays behind in vessel 1.

The volume of air with part of the vapour amounts to 0.7 to 1.0 m$^3$ after passing of the cooled column 7, dependent on the temperature and the pressure in the balloon or gasholder 8.

When after a few seconds the mixture has flown through this column 7 to the balloon or gasholder 8 the shut off valve 2 is being closed and the shut off valves 3 and 4, which connect vessel 1 with the cooled vapour condenser 6, open, while the liquid circulating pump 9 and the vapour ventilator 10 become effective.

Dependent on the temperature of the cooled condenser 6 the temperature of the ebullient liquid in vessel 1 will be −10° to −40° C.

This temperature is chosen according to the requirements, which have been put to the freezing speed of the food. The product freezes completely in 3 to 90 minutes. Meanwhile the airpump 11 circulates the mixture of air and vapour through column 7 via the lines 21, 22, 28 and 20 while the shut off valve 12 is open, while the continuously working cooling plant 13 of column 7 will reduce the temperature of the liquid in column 7 to −60° to −90° C. The food being completely frozen, the shut off valves 3 and 4 between vessel 1 and condenser 6 are closed, pump 9 and ventilator 10 are brought to a standstill, the shut off valves 2 and 5 are opened and the shut off valve 12 is closed.

In the vessel 1 there is still about 6 kg of vapour left, so about 1/5 part of the quantity needed when the air was expelled from vessel 1.

When the airpump 11 has circulated 3,000 to 5,000 liter of air with the low vapour tension of the liquid, then the vapour tension in vessel 1 has fallen to 0.05 to 0.01 bar above the vapour tension in the balloon or the gasholder 8, which at −60° C in column 7 is equal to 0.23 bar and at −90° C is about 0.03 bar. So the vapour tension in vessel 1 is than 0.28 to 0.04 bar dependent on the circulated quantity of air and the temperature of the liquid in column 7. Both quantities may be chosen at liberty according to the requirements being put to the activity of the recovery of vapour according to the process of working of the invention and they afford the opportunity of choosing the activity of recovery.

The vapour still left in vessel 1, will be lost if the shut off valves 2 and 5 are being closed and the food leaves the vessel. With a vapour tension of 0.28 bar in the vessel this amounts to appr. 1.7 Kg, with a vapour tension of 0.04 bar this will be 0.24 kg of vapour, per 1,000 kg frozen food, so that the loss may be reduced to less than 0.1 kg/100 kg of food.

According to this method about 30 kg of vapour must be condensed in column 7 by way of contact with the cold liquid, furthermore about 1.25 kg of air have to be cooled and one has to take account of some heat supply owing to conduction, as a result of which per 1,000 kg of product 1,500 to 2,500 kcal will have to be discharged in total at column temperatures 7 between −40° and −90° C.

For the freezing of the food there will be necessary per 1,000 kg, dependent on its nature and its starting- and final temperature, 75,000 to 120,000 kcal, which will have to be discharged by the cooling plant 15 of the condenser 6 for the damp of the liquid refrigerant.

The cooling capacity for column 7 amounts therefore to 2.5 to 3.5 percent of that for the condenser 6.

For cooling plant 13 of column 7 a cryogenerator of a well-known construction or a simple compression cooling plant of small capacity with a suitable freezing medium will be considered, for instance R22 − R13 or Freon 12 Bromine 1, with which the condenser 14 is cooled by the evaporating freezing medium of the cooling plant 15 for the condenser 6 of the vapour or by part of the liquid from the condenser 6.

The cooling plant 13 of column 7 will, at a lowest temperature in column 7 of −60° C, work at an average evaporating temperature of about −50° C and at a lowest temperature in column 7 of −90° C, at an average evaporating temperature of about −60° C.

An important characteristic of the process of working as described earlier is, that in vessel 1 or in the locks which are connected with the freezing apparatus for the introduction or discharge of the food, the pressure is almost equal to the atmospheric pressure, as a result of which it is possible to freeze food, which might deform or become unfit for use owing to changes of pressure, such as many frothy foods, for instance ice-cream, whipped cream, pastry etc. by bringing them into contact with an ebullient freezant.

What we claim is:

1. A process for freezing food products by direct contact with an evaporating liquid freezing agent in a freezing vessel comprising placing said food products in said vessel, closing said vessel, purging said closed vessel in order to substantially remove the air in said freezing vessel by introducing vapors of said liquid freezing agent to form a first freezing agent vapor-air mixture, recovering the freezing agent from said first freezing agent vapor-air mixture by passing said first freezing agent vapor-air mixture along a cold surface so that said freezing agent vapor condenses, freezing said food by direct contact with said liquid freezing agent forming freezing agent vapors, purging said closed freezing vessel with air to substantially remove said freezing agent vapor and form a second freezing agent vapor-air mixture, recovering said freezing agent from said second freezing agent vapor-air mixture by passing said second freezing agent vapor-air mixture along said cold surface so that said freezing agent vapor condenses, opening said freezing vessel and removing said food from said vessel.

2. The process of claim 1 which additionally comprises the step of storing the air from said first freezing agent vapor-air mixture subsequent to the removal of said freezing agent vapor by said cold surface and reutilizing said stored air for purging said freezing agent to form said second freezing agent vapor-air mixture.

3. The process of claim 1 wherein the recovery of said freezing agent from said first freezing agent vapor-air mixture is conducted simultaneously with the freezing of said food by direct contact with said liquid freezing agent, said recovery comprising continuously circulating said first freezing agent vapor air mixture along said cold surface in order to substantially remove the freezing agent from said first freezing agent vapor-air mixture.

4. The process of claim 3 which additionally comprises the step of storing the air from said first freezing agent vapor-air mixture subsequent to the removal of said freezing agent vapor by said cold surface and reutilizing said stored air for purging said freezing agent to form said second freezing agent vapor-air mixture.

5. The process of claim 1 wherein the temperature of said cold surface is lower than the final temperature of the product to be frozen.

6. The process of claim 5 wherein said lower temperature is generated by a compressor cooling plant having a condenser cooled by a main cooling plant.

7. The process of claim 5 wherein the lower temperature is generated by a cryogenator.

8. The process of claim 1 wherein the pressure within the freezing vessel is essentially equal to atmospheric pressure.

9. The process of claim 8 wherein the partial pressure of the air in the freezing chamber during freezing is lower than 0.05 bars.

10. The process of claim 1 wherein the vapor pressure of the vapor of the freezing agent which is present in the said freezing vessel when the frozen products are removed is lower than 0.28 bars.

11. The process of claim 10 wherein the partial pressure is lower than 0.05 bars.

* * * * *